United States Patent Office 3,305,535
Patented Feb. 21, 1967

3,305,535
PREPARATION OF POLYURETHANE PLASTICS
Rudolf Merten and Günther Braun, Cologne-Flittard, Germany, assignors to Farbenfabriken Bayer Aktiengesellschaft, Leverkusen, Germany, a German corporation
No Drawing. Filed Feb. 28, 1961, Ser. No. 92,145
Claims priority, application Germany, Mar. 3, 1960, F 30,671
2 Claims. (Cl. 260—77.5)

This invention relates to intermediates and to polyurethane plastics prepared from the intermediates and more particularly to intermediates containing carbohydrates and improved polyurethane plastics obtained therefrom.

It is well known to prepare polyurethane plastics from polyhydroxyl compounds such as, polyesters, polyethers, polythioethers, polyacetals and the like which contain free hydroxyl groups, organic polyisocyanates and, if necessary, cross linking agents such as, polyhydric alcohols, polyamines, water and the like. It has also been proposed heretofore to use water-soluble carbohydrates concurrently with the above-mentioned hydroxyl compounds. However, various difficulties preclude a more extensive use of these polyfunctional and readily available components even though the use of such compounds is per se desirable.

The use of carbohydrates and especially cane sugar as a starting material for the production of polyesters and polyacetals is generally unsuccessful because of the low thermal stability of these compounds and also their poor solubility in most of the organic solvents.

The only exceptions in this respect are the sulphoxides and formamides which are difficult to separate because of their high boiling point and their solubility properties and water cannot be considered as a solvent for reasons which are readily apparent. These same obstacles arise in the production of addition products of carbohydrates and alkylene oxides. In German patent specification 1,064,938 a process for the production of octa-(2-hydroxyl propyl)-saccharose by the use of special catalysts is described. This patent also suggests preparing polyurethane plastics from the product. This procedure is subject to various disadvantages. For example, a maximum of one molecule of propylene oxide can be added to each alcoholic hydroxyl group by the use of trialkylamine catalysts to produce a product which is extremely viscous and can only be processed with great difficulty. This product is, therefore, unsuitable for many purposes including the preparation of cellular plastics.

Moreover, because cane sugar melts at high temperatures with incipient decomposition, it must be introduced into the propylene oxide which serves as a solvent and a dispersing agent. This requires special technical equipment and apparatus to avoid a spontaneous and highly exothermic polymerization of the propylene oxide.

It is, therefore, an object of this invention to provide new hydroxyl bearing intermediates for use in the preparation of polyurethane plastics. It is another object of this invention to provide polyurethane plastics based on carbohydrates. It is still another object of this invention to provide an improved method for making polyurethane plastics from carbohydrates. It is a further object of this invention to provide a method for making an hydroxyl bearing intermediate suitable for preparing polyurethane plastics from carbohydrates. It is a still further object of this invention to provide economical polyurethane plastics based on carbohydrates which may take the form of cellular plastics, substantially nonporous elastomeric plastics, film-like structures, adhesives and the like.

The foregoing objects and others which will become apparent from the following description are accomplished in accordance with the invention, generally speaking, by providing a polyhydroxyl compound having use in reaction with organic polyisocyanates and, if necessary, cross-linking agents to prepare polyurethane plastics, the hydroxyl compound being prepared by dissolving a water-soluble carbohydrate having at least four carbon atoms in a water alcohol solution or water phenol solution to which has been added an acid catalyst, removing the water to a residual content of less than one percent and reacting the product obtained thereby with an alkylene oxide. Thus, the invention contemplates the preparation of a polyhydroxyl-containing intermediate by the alkylation of the product prepared from a water-soluble carbohydrate and an alcohol, phenol or mixture thereof in the presence of an acid catalyst.

It is also desirable to condense oxo compounds such as, aldehydes and ketones with the carbohydrate and alcohol or phenol prior to the water removal step and then reacting this product with an alkylene oxide.

The polyhydroxyl compounds obtained according to this invention range from thinly liquid up to highly viscous solutions depending upon the nature and quantity of the starting materials. Polyhydroxyl compounds having a very wide range of properties can be prepared and used according to this invention. A further advantage consists in that the solutions or condensates to which the alkylene oxide is added show no tendency toward crystallization or decomposition and thus can be initially applied in the poly-addition so that an improved and reliable process is obtained.

The quantity of carbohydrate and alcohol or phenol used is within the range of from 2 to 98 percent by weight, preferably within the range of from 20 to 95 percent by weight. When an oxo compound is utilized along with a carbohydrate and an alcohol or phenol, the ratios between the three components are preferably chosen so that the final product has an hydroxyl content of at least about one percent by weight. Moreover, at least about 0.5 mol of the oxo compound is used for each monosaccharide unit present in the carbohydrate. "Monosaccharide unit" refers to the number of basic saccharide units in the molecule, i.e. a disaccharide has two monosaccharide units, a trisaccharide has three etc. The quantity of the alcohol or phenol component is preferably such that from about 0.2 to about 4 —OH equivalents are present for each mol of the oxo compound, with the proviso that at least about 0.5 —OH equivalents are used for each monosaccharide unit present in the carbohydrate. The reaction of the three components normally takes place with the concurrent use of water as a solvent. The water may either be added during the condensation or can be supplied, for example, as a solvent for one of the components as is the case when formalin is the oxo component. The reaction mixture is preferably heated until homogeneity is reached. Temperatures within the range of from about 50° C. to about 100° C. are preferred. It is also possible to carry out the reaction under pressure. After the condensation is essentially complete, the water is removed, for example, by distillation. The residual water of condensation is reduced to less than one percent and preferably to about 0.5 percent by weight or lower, for example, by reducing the pressure to about 12 mm. Hg./90° C. Furthermore, the product may be washed with organic solvents such as benzene, chloroform, dioxane and the like to concurrently remove the water.

The polyhydroxyl compounds prepared in accordance with the above teaching can be mixed with other compounds which are reactive with alkylene oxides such as, for example, alcohols, phenols, amines, polyesters such as castor oil, low molecular weight polyethers and the like prior to the condensation reaction with an alkylene oxide. Any of the alcohols, phenols, polyesters and polyethers listed below may be used. Any suitable organic amine may be used such as, for example, ethyl amine, propyl amine, hexyl amine, aniline, cyclohexyl amine, ethylene diamine, propylene diamine, hexylene diamine, phenylene diamine, toluylene diamine, cyclohexylene diamine, hydrazine and the like.

The addition of alkylene oxides is preferably effected in the presence of from about 0.01 to about 3 percent by weight of an alkali catalyst such as, for example, KOH, NaOH, NaOCH$_3$, potassium carbonate, trimethyl amine, triethyl amine, benzyl trimethyl ammonium hydroxide and the like. A more rapid reaction and a better control of the addition is possible at relatively high temperatures of from about 100 to about 200° C. and, therefore these conditions are preferred. The modified carbohydrate prepared in accordance with the above is preferably initially supplied and the alkylene oxide is added in portions or continuously during the reaction. Any suitable alkylene oxide may be used for the production of polyhydroxyl compounds in accordance with this invention such as, for example, ethylene oxide, propylene oxide, epichlorhydrin, butylene oxides, amylene oxides, styrene oxide, phenoxy propylene oxide, 1-allyloxy-2,3-epoxy propane. Propylene oxide is preferred.

The properties of the polyhydroxyl compounds obtained by this process can be varied as desired by the choice and quantity of starting components used. For example, polyhydroxyl compounds having varying hydroxyl contents, solubility, viscosity and like factors can be obtained by adjusting the choice and quantities of starting components. The quantity of alkylene oxide used in the addition should generally be between from about 5 to about 95 percent by weight based on the quantity of product obtained. It is preferred that the quantity of alkylene oxide be between from about 30 to about 85 percent by weight on the quantity of product obtained. The polyhydroxyl compounds prepared in accordance with this invention have an hydroxyl number of from about 30 to about 1000 and preferably of from about 150 to about 750.

Any suitable carbohydrate may be used for the production of the polyols of the invention which are suitable for further reaction with organic polyisocyanates to prepare polyurethane plastics, provided that the carbohydrate contains at least 4 carbon atoms. The term "carbohydrate" as used herein refers to compounds composed of carbon, hydrogen and oxygen corresponding to the formula $C_x(H_2O)_y$ wherein $x$ and $y$ are whole integers and thus the compounds are monosaccharides when $x$ and $y$ are 4 to 7, disaccharides when $x$ is 12 and $y$ is 11, trisaccharides when $x$ is 18 and $y$ is 16 and polysaccharides when $x$ and $y$ are integers greater than 18. In other words, the bioses and trioses are excluded because they do not contain at least 4 carbon atoms, but any other suitable carbohydrates may be used including such monosaccharides as tetroses for example erythrose, erthrulose and the like; pentoses for example arabinose, xylose, ribose, arabinulose and the like; hexoses for example glucose, galactose, mannose, fructose, sorbose and the like; heptoses for example mannoheptose and the like; disaccharides such as loctose, maltose, sucrose, meliboise, trehalose, celluboise and the like; trisaccharides such as raffinose, melezitose and the like; tetrasaccharides such as lupeose, stachyose, cellotetraose and the like; polysaccharides including the dextrin, the starches, cellose and the like. In some cases it is necessary to treat the polysaccharides with acid catalysts and perhaps under pressure in order to bring them into a soluble form. In addition to the pure carbohydrates, condensates obtained by the condensation of formaldehyde under alkaline conditions and known as formose may be used. It is possible for a formose which contains unreacted formaldehyde to be reacted directly with an alcohol or a phenol to prepare the polyols of the invention. Carbohydrates originally containing at least 4 carbon atoms which have been partially modified by reacting at their hydroxyl and/or carbonyl groups may also be used such as, for example, the partial acylation products, alkylation products, sugar anhydrides, sugar acids, acetalization or ketalization products of carbohydrates may also be used in the process of the invention. Of course, where acetalization or ketalization products are used they need only be modified with the alcohols or phenols to prepare the polyols of this invention. Any of the modified compounds may be used provided they contain at least one free hydroxyl group in the molecule.

Any suitable oxo compound may be used in the process of the present invention including the various aldehydes and ketones as well as substances which will generate these compounds such as, for example, formaldehyde, acetaldehyde, propionaldehyde, butyraldehyde, isobutyraldheyde, benzaldehyde, furfural, acetone, methylethyl ketone, cyclohexanone, glyoxal, chloral or chloralhydrate, but advantageously formaldehyde is used in the various forms in which it is supplied commercially, such as Formalin or paraformaldehyde and the like.

Any suitable alcohol, i.e. those in which the —OH is bonded directly to an aliphatic carbon atom, may be used including monohydric and polyhydric alcohols, it being preferred to use those which are not extracted by boiling water. In other words, it is preferred to use those alcohols which are not removed from the reaction mixture under the same conditions which will cause removal of the water as by distillation etc. Moreover, it is preferred not to use alcohols which will form low boiling linear or cyclic acetals. Thus, it is preferred to use monohydric alcohols which boil at atmospheric pressure above about 100° C. including those alcohols from $C_4$ to $C_{18}$ such as, for example, butanol, pentanol, hexanol, heptanol, octanol, nonyl alcohol, decyl alcohol and the like up to and including octadecyl alcohol and the various positional isomers of each of these as well as mixtures thereof; stearyl alcohol, ethylene chlorohydrin, ethylene cyanohydrin, dichlorohydrin, oleyl alcohol, benzyl alcohol, cyclohexanol and the like. For the reason given above, the polyhydric alcohols should as far as possible not form any cyclic acetals. Consequently, it is preferred to use those alcohols in which the hydroxyl groups are separated from one another by at least 4 carbon, oxygen, sulfur and/or nitrogen atoms, it being possible for the alcohol in other respects to contain any desired substituents. Suitable polyhydric alcohols are for example, butane-1,4-diol, butene-1,4-diol, butyne-1,4-diol, pentane-1,4-diol, pentane-1,5-diol, hexane-1,6-diol, 7,18-dihydroxyoctadecane, 4,4'-dihydroxydicyclohexyl methane, 4,4'-dihydroxydicyclohexyldimethylmethane, castor oil and also the adducts of alkylene oxides (such as ethylene oxide, propylene oxide, butylene oxide, styrene oxide, epichlorohydrin and the like), with the above alcohols as well as the polyalcohols which otherwise form cyclic acetals, with their sulfur analogues and also polyphenols. Specific examples are the adducts of these alkylene oxides with butylene glycol, propane-1,2-diol, propane-1,3-diol, butane-1,3-diol, butane-2,3-diol, glycerine, trimethylol propane, trimethylol ethane, hexane-1,2,6-triol, pentaerythritol, sorbitol, mannitol, sugar in the broader sense, hydroquinone, 4,4'-dihydroxydiphenyl methane, 4,4'-dihydroxydiphenyl dimethyl methane, thiodiglycol and the like.

Any suitable phenol may be used such as, for example, phenol, o-, m-, and p-cresols, as well as their technical mixtures, xylenols, tertiary butyl phenols, p-nonylphenol, chlorophenols, resorcinol, naphthols, nitrophenols, polychlorophenols, resorcinol-monoethers, saligenin, triethylphenol and bis-(hydroxyphenyl)-alkanes and the like.

In accordance with one preferred embodiment of the invention mixtures of alcohols and phenols are used in the preparation of the polyols. Thus, a small addition of for example phenol or p-tertiary butyl phenol (for example from about 0.1 to about 2.5 mol percent, based on the monohydric or polyhydric alcohols introduced), produces a clearly apparent thermal stabilizing effect with respect to the polyhydroxyl compounds serving as initial material according to the invention. This fact is shown, inter alia in the subsequent foaming and by a uniform color of the foam materials produced. Higher proportions of phenolic hydroxyl groups lead to a water-repelling effect of the polyhydroxyl compounds and thus also of the reaction products with polyisocyanates which are produced according to the invention. In this way, for example, the water storage capacity is improved and the possibility of attack by polar solvents is reduced. Furthermore, a better compatibility between the polyhydroxyl compound and the generally water-repellant polyisocyanate component is observed and this produces better workability.

The reaction can be catalyzed by adding acid substances, for which purpose quantities of from 0.005 weight percent to 5 weight percent are usual. An amount of 0.01–1 weight percent is preferred depending on the acid strength. Suitable acids are, for example, free organic and inorganic acids, such as hydrochloric acid, $H_2SO_4$, $P_2O_5 \cdot xH_2O$, $B_2O_3$, $HClO_4$, $HBF_4$, $HF$, $HBr$, $HI$, $BF_3 \cdot 2H_2O$, $HNO_3$, $H_2SO_3$, formic acid, acetic acid, propionic acid, the haloacetic acids, oxalic acid, benzoic acid, benzene- and toluene-sulphonic acids, higher polystyrenesulphonic acids, if necessary in the form of ion exchangers and also substances which react acidly, or change in the presence of water into acids, that is to say, all Lewis acids such as $AlCl_3$, $BF_3$, RCOCL wherein R is alkyl such as methyl, ethyl and the like, $PCl_3$, $PCl_5$, chlorosulphonic acid $ZnCl_2$, $SnCl_4$, $TiCl_4$ and the like.

Generally speaking, the quantity of phenolic component employed can amount to from about 1 to about 100 mol percent of the alcoholic component, but a lower limit is set at 0.1 mol of phenolic component for each monosaccharide unit in the carbohydrate.

The polyhydroxyl compounds prepared in accordance with the above serve as valuable intermediates in the preparation of polyurethane plastics to produce films, lacquers, coatings, adhesive compounds, homogeneous elastomeric products and porous cellular products having good resistance to solvents. The elastomeric products may be fabricated into final products such as, heel lifts for womens shoes, valve seats, bushings, bearings for automobile parts, automobile tires and the like. The cellular materials can be formed into resilient or rigid end products. The resilient products can be fabricated into cushions, pillows and the like for use in the furniture industry, while the rigid cellular products are useful as both sound and heat insulation in the building industry.

In the production of polyurethane plastics in accordance with this invention, the polyhydroxyl compounds prepared in the manner set forth above are reacted with organic polyisocyanates and in some cases cross-linking agents. Any suitable organic polyisocyanate may be used such as, for example, aliphatic, aromatic and heterocyclic organic polyisocyanates including for example, tetra- and hexamethylene diisocyanates, arylene diisocyanates and their alkylation products such as the phenylene diisocyanates, naphthylene diisocyanates, diphenyl methane diisocyanates, toluylene diisocyanates, di- and triisopropyl benzene diisocyanates, triphenyl methane triisocyanates, tri-(p-isocyanato phenyl)-thiophosphoric acid triester, tri-(p-isocyanato phenyl)-phosphoric acid triester, aralkylene diisocyanates such as, 1-(isocyanate phenyl)-ethyl isocyanate or the xylylene diisocyanates as well as the polyisocyanates of the above type substituted by various substituents such as oxyalkyl, oxyaryl, for example, —$CH_3$, —$OC_6H_6$ and the like, $NO_2$, Cl etc.; furfurylidene diisocyanate; in addition, the reaction products of the above isocyanates with deficient quantities of polyhydroxyl compounds such as, trimethylol propane, hexanetriol, glycerine and butanediol. Polyisocyanates masked, for example, with phenols of bisulfites and also polymerized isocyanates with isocyanurate rings are also to be mentioned.

In accordance with the process of the invention as stated above, it is possible to prepare many different types of polyurethane plastics including coatings, cellular polyurethanes and noncellular polyurethanes which may be either cast or molded into useful articles of manufacture. It is also possible to mix the polyhydroxyl compounds described above which are prepared from invert sugar and alkylene oxides with heretofore known organic compounds containing at least two active hydrogen containing groups as determined by the Zerewitinoff method, such as, for example, hydroxyl polyesters, polyhydric polyalkylene ethers, polyhydric polythioethers and the like. It is preferred to use organic compounds containing at least two active hydrogen containing groups as determined by the Zerewitinoff method which are reactive with an isocyanate group and include —OH, —$NH_2$, —NH, —COOH, —SH and the like. The molecular weight of these compounds containing active hydrogen containing groups may vary over a wide range, but is preferably within the range of from about 500 to about 10,000. Furthermore, these compounds preferably have hydroxyl numbers between about 50 and about 350 and acid numbers, where applicable, preferably below about 5.

Any suitable hydroxyl polyester may be used such as is obtained for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelac acid, sebaccic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemilellitic acid, trimellitc acid, trimesic acid, mellophanic acid, prehnitic acid, pyromellitic acid, benzenepentacarboxylic acid, 1,4-cyclohexanedicarboxylic acid, 3,4,9,10-perylenetetracarboxylic acid and the like. Any suitable polyhydric alcohol may be used such as, for example, ethylene glycol, 1,3-propylene glycol, 1,2-propylene glycol, 1,4-butylene glycol, 1,3-butylene glycol, 1,2-butylene glycol, 1,5-pentanediol, 1,4-pentanediol, 1,3-pentanediol, 1,6-hexanediol, 1,7-heptanediol, glycerine, trimethylolpropane, 1,3,6-hexanetriol, triethanolamine, pentaerythritol, sorbitol and the like.

Any suitable polyhydric polyalkylene ether may be used such as, for example, the condensation product of an alkylene oxide or of an alkylene oxide with a polyhydric alcohol. Any suitable polyhydric alcohol may be used such as, those disclosed above for use in the preparation of the hydroxyl polyesters. Any suitable alkylene oxide may be used such as, for example, ethylene oxide, propylene oxide, butylene oxide, amylene oxide, and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols and the like. It is often advantageous to employ some trihydric or higher polyhydric alcohols such as glycerine, trimethylolpropane, pentaerythritol and the like in the preparation of the polyhydric polyalkylene ethers so that some branching exists in the product. Generally speaking, it is advantageous to condense from about 5 to about 30 mols of alkylene oxide per functional group of the trihydric or higher polyhydric alcohol. These polyhydric polyalkylene ethers may be prepared by any known process such as, for example, the process disclosed by Wurtz in 1859 and in the Encyclopedia of Chemical Technology, vol. 7, pp. 257–262, published by Interscience Publishers, Inc. (1951), or in U.S. Patent 1,922,459.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Patents 2,862,972 and 2,900,368.

The hydroxyl polyester may also be a polyesteramide such as is obtained, for example, by including some amine or amino alcohol in the reactants for the preparation of the polyesters. Thus, polyesteramides may be obtained by condensing an amino alcohol such as ethanolamine with the polycarboxylic acids set forth above or they may be made using the same components that make up the hydroxyl polyester with only a portion of the components being a diamine such as ethylene diamine and the like.

The polyhydroxyl compounds of this invention, i.e. those obtained from carbohydrates, alcohols or phenols and alkylene oxides can be reacted with an excess of an organic polyisocyanate above that required to react with the hydroxyl groups to obtain a prepolymer containing terminal isocyanate groups which is then reacted with a cross-linking agent or the polyhydroxyl compound. The organic polyisocyanate and the cross-linking agent may be combined in a single step to prepare a polyurethane plastic. Various additional reagents, catalysts, stabilizers and other additives may be added for the production of a particular type of compound or for the production of a compound having a particular utility, but the essential feature of the invention is the production of polyurethane plastics from these materials.

The cellular polyurethane plastics may be prepared using carbon dioxide generated by water reacted with an excess of organic polyisocyanate as a blowing agent or a halohydrocarbon such as dichlorodifluoromethane, trichlorofluoromethane and the like, azo compounds such as, for example, diazoaminobenzene, low boiling point alkanes such as pentene, may be used. Either the prepolymer referred to above may be reacted with water to produce a cellular polyurethane plastic or in the alternative the organic polyisocyanate may be reacted with the polyhydroxyl compound of this invention and water or in the presence of the halohydrocarbon to prepare a cellular polyurethane plastic in a one-step procedure. It is often advantageous in the production of cellular polyurethane plastics to include other additives in the reaction mixture such as, for example, emulsifiers, foam stabilizers, coloring agents, fillers and the like. It is particularly advantageous to employ an emulsifier such as, for example, sulphonated castor oil and/or a foam stabilizer such as a silicone oil such as, for example, a polydimethyl siloxane or an alkyl silane polyoxyalkylene block copolymer. The latter type of silicone oil is disclosed in U.S. Patent 2,834,748. Where polyhydric polyalkylene ethers are included in the reaction mixture to prepare a cellular polyurethane plastic, it is preferred to employ a silicone oil of the above patent within the scope of the formula:

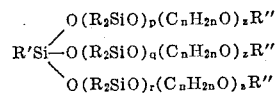

wherein R, R′ and R″ are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. Most preferred is a compound having the formula:

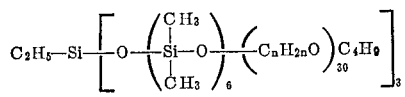

wherein $(C_nH_{2n}O)$ is a mixed polyoxyethylene and oxypropylene block copolymer containing about 17 oxyethylene units and about 13 oxypropylene units.

It is preferred to include a catalyst in the reaction mixture leading to the production of the cellular polyurethane plastics. Suitable catalysts are, for example, tertiary amines such as, for example, triethylene diamine, N-methyl morpholine, N-ethyl morpholine, diethyl ethanolamine, N-coco morpholine, 1-methyl-4-dimethylamine ethyl piperazine, 3-methoxy-N-dimethyl propyl amine, N-dimethyl-N′-methyl isopropyl propylene diamine, N,N-diethyl-3-diethyl amino propyl amine, dimethyl benzyl amine and the like. Other suitable catalysts are for example, molybdenum glycolate, tin compounds such as stannous chloride, dialkyl tin salts of carboxylic acids, such as dibutyl tin di-2-ethyl hexoate, tin alcoholates such as stannous octoate, as well as other organometallic compounds such as are disclosed in U.S. Patent 2,846,408.

Another embodiment of this invention involves the production of substantially nonporous polyurethane plastics by reacting an organic polyisocyanate with at least a stoichiometric amount of the polyhydroxyl compound of this invention and then reacting the resulting product which contains terminal hydroxyl groups with an organic peroxide, sulphur, formaldehyde or the like to produce a highly cross-linked substantially nonporous polyurethane plastic. By still another procedure, substantially nonporous polyurethane plastics are produced from the above-described prepolymer containing terminal —NCO groups by reaction thereof with water, polyhydric alcohols, polyamines, amino alcohols and the like. This makes it possible to produce a two-component system for the production of substantially nonporous polyurethane plastics including castings, coatings, moldings and the like. Castings are prepared by mixing either a monomeric organic polyisocyanate or the above-described isocyanate terminated prepolymer with a cross-linking agent, pouring the resulting mixture into a mold and allowing it to cure to form a substantially nonporous elastomer. Substantially anhydrous conditions are maintained throughout the casting procedure. It is also possible to produce a coating composition by dissolving the organic polyisocyanate, polyhydroxyl compound containing either terminal —NCO groups or —NCO groups which have been blocked with a low molecular weight alcohol or phenol in an organic solvent such as, for example, xylene, ethyl acetate, toluene, ethylene glycol, monoethyl ether acetate and the like. The coating composition can be applied in any suitable way such as by dipping, brushing, rolling, spraying and the like. Any suitable substrate may be coated such as, for example, wood, metal, paper and the like.

The products obtained by the invention show advantageous mechanical properties, with many possibilities of varying the starting components, these determining the nature and properties of the final products according to the procedure employed. For example, lacquers and coatings with a low degree of brittleness and good bonding power and also hard foam materials with good internal strength and elasticity are obtained.

The invention is further illustrated by the following examples in which parts are given by weight otherwise specified.

*Example 1.—Production of the polyhydroxyl compound*

About 686 parts (2 mols) of cane sugar, about 308 parts of a technical triethylene glycol with an average molecular weight of 154, about 200 ml. of water and about 1 ml. of 70% aqueous HBF$_4$ are heated for about 4 hours at about 90° C. The added water and the water present in the initial substances is then almost completely removed at the same temperature and at a vacuum of 12 to 15 mm. Hg. The batch is left towards the end for 4 hours at 90° C./12 mm. Hg. About 9 parts of KOH in powder form are then added. At about 120 to about 140° C., about 1160 parts of propylene oxide are pumped in according to the exothermic addition proceeding under the prevailing fall in pressure. After completing the addition, the temperature is kept for about another 2 hours at about 130° C., and volatile fractions are removed at 100° C., and a vacuum of about 12 mm. Hg. A yield consisting of 2100 parts is obtained in the form of a brown liquid condensate having a viscosity of about 1900 cp./25° C., an acid number of about 1.7, an hydroxyl content of about 18.2% and a water content below 0.1%.

About 100 parts of the polyhydroxyl compound prepared in this way are thoroughly mixed with about 0.3 part of butyl-tin-dilaurate, about 0.3 part by weight of a polysiloxanealkylene oxide copolymer having the formula:

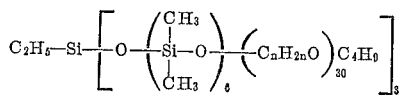

and about 4 parts of a 50% aqueous solution of sodium castor oil sulphate.

The mixture is foamed with addition of about 192 parts of 4,4'-diphenylmethane diisocyanate. A hard foam plastic is obtained which has a low degree of brittleness and has the following physical properties:

| | |
|---|---|
| Weight per unit volume kg./cm.$^3$ | 59 |
| Compressive strength kg./cm.$^2$ | 4.1 |
| Impact toughness kg./cm. | 0.4 |
| H$_2$O absorption percent | 1.3 |
| Thermal bending strength °C | 148 |

*Example 2.—Production of the polyhydroxyl compound*

About 2742 parts (8 mols) of cane sugar, about 1320 parts (16 mols CH$_2$O) of a 37% by weight formalin solution, about 752 parts (8 mols) of phenol and about 3.2 parts of 70% HBF$_4$ are heated for about 4 hours at about 90° C. The added and water formed are distilled off with a slowly rising vacuum up to a maximum of 50 mm. Hg, the temperature being continuously raised to from about 120 to about 130° C. towards the end of the operation. There are obtained about 3540 parts of a resin which is brittle at room temperature and which softens as the temperature rises. The resin has an hydroxyl content of about 26.2% and an acid number of about 4.0 and a residual water content of about 0.54%.

About 922 parts of this resin are mixed with about 9 parts of powdered KOH, and then about 1928 parts of propylene oxide are added at from about 130 to 140° C., in a manner analogous to Example 1. After vacuum treatment at about 100° C., there remain about 1800 parts of a brown condensate having a viscosity of about 57,000 cp./25° C., an hydroxyl content of about 18.0%, an acid number of about 1.5 and a residual water content of about 0.05%.

About 100 parts of the polyhydroxyl compound prepared in this way are stirred with about 3 parts of N-dimethylaminopropylethyl ether, about 0.3 part of a polysiloxane-alkylene oxide copolymer having the formula:

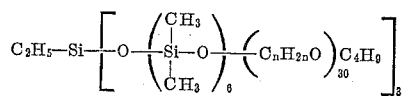

and about 4 parts of a 50% aqueous solution of sodium castor oil sulphate. The mixture is foamed with about 190 parts of 4,4'-diphenyl methane diisocyanate. A non-shrinking fine-pored foam plastic is obtained which has the following physical properties:

| | |
|---|---|
| Weight per unit volume kg./cm.$^3$ | 57 |
| Compressive strength kg./cm.$^2$ | 6.0 |
| Impact toughness kg./cm. | 0.3 |
| H$_2$O absorption percent | 0.2 |
| Thermal bending strength °C | 190 |

*Example 3.—Production of the polyhydroxyl compound*

About 343 parts (1 mol) of cane sugar, about 165 parts (2 mols CH$_2$O) of a 37% by weight formalin solution and about 1.2 parts of 70% HBF$_4$ are heated for about 4 hours at about 90°C. The major part of the added and formed water is then removed at about 90° C. with a rise in vacuum. About 150 parts (1 mol) of tertiary butyl phenol are then slowly added over a period of about 2 hours and the reaction mixture is finally condensed into a thick viscous resin while slowly raising the temperature to about 140° C., and the pressure to about 12 mm. Hg. This resin then has added thereto about 5 parts of powdered potassium hydroxide at 130 to 140° C. in a manner analogous to Example 1. About 464 parts (8 mols) of propylene oxide are then added. A quantitative yield of 970 parts is obtained of a viscous yellowish brown adduct having an hydroxyl content of about 17.3%, an acid number of about 3.2, a viscosity of 6900 cp./25° C. and a residual water content less than 0.2%.

About 100 parts of the polyhydroxyl compound thus obtained are mixed with about 1 part of permethylated aminoethyl piperazine, about 0.3 part of dibutyl tin dilaurate, about 0.3 part of a polysiloxane-alkylene oxide copolymer having the formula:

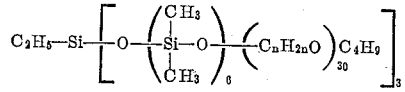

and about 4 parts of a 50% aqueous solution of sodium castor oil sulphate. By adding about 185 parts of 4,4'-diphenyl methane diisocyanate, a fine-pored, non-shrinking hard foam plastic is obtained with the following physical properties:

| | |
|---|---|
| Weight per unit volume kg./cm.$^3$ | 59 |
| Impact toughness kg./cm. | 0.4 |
| Compressive strength kg./cm.$^2$ | 5.2 |
| H$_2$O absorption percent | 0.3 |
| Thermal bending strength °C | 154 |

*Example 4.—Production of the polyhydroxyl compound*

About 922 parts of a condensate prepared according to Example 2 from 1 mol of cane sugar, 2 mols of formaldehyde and 1 mol of phenol are reacted in the manner described therein and in the presence of about 9 parts of KOH with about 1160 parts of propylene oxide to give about 2052 parts of a brown condensate having an hydroxyl content of about 15.7%, a residual water content of about 0.05%, an acid number of about 2.4 and a viscosity of about 31,800 cp./25° C.

About 100 parts of the polyhydroxyl compound prepared in this way are mixed with about 0.5 part of permethylated aminoethyl piperazine, about 0.3 part by weight of dibutyl tin dilaurate, about 0.3 part of a polysiloxane-alkylene oxide copolymer having the formula:

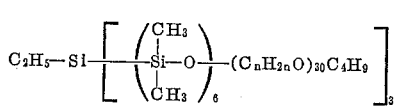

about 30 parts of trichloro-monofluoromethane. About 137 parts of 4,4'-diphenyl methane diisocyanate are added. A hard foam plastic is obtained which has the following physical properties:

| | |
|---|---|
| Weight per unit volume | kg./cm.³ 46 |
| Compressive strength | kg./cm.² 3.6 |
| Impact toughness | kg./cm. 0.2 |
| H₂O absorption | percent 0.6 |
| Thermal bending strength | °C 140 |

*Example 5.—Production of the polyhydroxyl compound*

About 343 parts (1 mol) of cane sugar, about 600 parts (7.4 mols $CH_2O$) of a 37% formalin solution, about 636 parts of diethylene glycol, about 60 parts (0.4 mol) of tertiary butyl phenol and about 0.26 part of 70% perchloric acid are heated for about 4 hours at about 90° C. This mixture is then concentrated at the same temperature up to a vacuum of 12 mm. Hg. A 95% yield is obtained of a condensate having an hydroxyl content of about 10.6%, an acid number of about 6.7, a viscosity of 12,300 cp./25° C. and a residual water content of about 0.31%. About 8 parts of powdered NaOH are added to about 1060 parts of this condensate and then, in a manner analogous to Example 1, about 580 parts of propylene oxide are added. About 1620 parts of an adduct are obtained having an hydroxyl content of about 8.9%, an acid number of about 2.5, a residual water content of about 0.08% and a viscosity of 6070 cp./25° C.

About 100 parts of this polyhydroxyl compound, about 55 parts of a toluylene diisocyanate containing the 2,4- and 2,6-isomers in the ratio 65:35, about 2 parts of a 50% aqueous soltuion of sodium castor oil sulphate, about 10 parts of trichloromonofluoromethane, about 0.2 part of tin-II-octoate and about 0.8 part of dimethyl aminopropylethyl ether are mixed together and rise within about 2 minutes into a non-shrinking, fine-pored foam plastic with good physical properties.

*Example 6*

About 35 parts of a polyhydroxyl compound according to Example 5 and about 15.8 parts of toluylene diisocyanate according to Example 5 are mixed together and permitted to set within about 2 hours into a solid insoluble plastic.

In similar manner, solvent-resistant lacquers are obtained from about 10 parts of the polyhydroxyl compound according to Example 5 and about 26.3 parts of a 45% solution of an adduct of excess toluylene diisocyanate with trimethylol propane in acetic ester with an —NCO content of 8.3%.

*Example 7.—Production of the polyhydroxyl compound*

About 1710 parts (5 mols) of cane sugar, about 282 parts (3 mols) of phenol, about 570 parts (7 mols $CH_2O$) of 37% formalin and about 1.5 parts of 70% $HBF_4$ are condensed in a manner analogous to Example 1. About 20 parts of powdered KOH are then added and in a manner similar to Example 1, about 4260 parts of propylene oxide are added to obtain about 6200 parts of a yellowish-brown condensate having an hydroxyl content of about 13.1%, and a viscosity of about 8300 cp./25° C.

About 30 parts of this polyhydroxyl compound are mixed with about 20.1 parts of toluylene diisocyanate according to Example 5 and hardened after standing for a short time and under a weakly exothermic reaction into a solid insoluble plastic having a small degree of brittleness.

*Example 8.—Production of the polyhydroxyl compound*

About 343 parts (1 mol) of cane sugar, about 245 parts (2 mols $CH_2O$) of a 37% by weight formalin solution, about 188 parts (2 mols) of phenol and about 0.6 part of a 70% $HBF_4$ are heated for about 4 hours at from about 90 to 100° C. and then condensed in vacuo under a slowly rising temperature up to 140 to 150° C. and 50 mm. Hg. About 560 parts of a brittle resin with an hydroxyl content of about 24.4% and an acid number of 28 are obtained.

To about 350 parts of this resin are added about 5 parts of solid KOH. At about 150° C., about 600 parts (5 mols) of styrene oxide are added dropwise within about 5 hours. The temperature is maintained for another 4 hours at about 160° C. and volatile fractions are removed in a vacuum up to about 12 mm. Hg. About 927 parts of a brown resin remain with an hydroxyl content of about 11.2% and an acid number of about 13.5.

About 15.2 parts of this polyhydroxyl compound are mixed with about 50.6 parts of a substantially 40–45% acetic ester solution of an adduct of excess toluylene diisocyanate and trimethylol propane which has 8.3% NCO. The mixture is dried at room temperature to form a solvent resisting lacquer.

*Example 9*

About 15.2 parts of the polyhydroxyl compound according to Example 8 are mixed with about 14 parts of 4,4'-diphenyl dimethyl methane diisocyanate and cured at a temperature of about 120° C., to form a solid and solvent-resistant plastic.

*Example 10.—Production of the polyhydroxyl compound*

About 350 parts of a phenol resin consisting of 1 mol of cane sugar, 3 mols of formaldehyde and 2 mols of phenol are mixed with about 7 parts of solid KOH and then, at 150° C. about 228 parts of allyloxy-2,3-epoxy propane are introduced dropwise in about 2 hours, about 360 parts of styrene oxide are added dropwise in about another 4 hours. This temperature is maintained for about another 5 hours and then the volatile fractions are removed in vacuo. About 909 parts of a dark brown resin are left having an hydroxyl content of about 12.8% and an acid number of 2.1.

About 13.8 parts of this polyhydroxyl compound are mixed with about 1.5 parts of crude thiophosphoric acid tri-o,o-phenylester - 4,4',4'' - triisocyanate having 27.1% NCO and cured at about 120° C., to form a solid and solvent-resistant plastic.

686 parts by weight of cane sugar, 212 parts by weight of diethylene glycol, 400 parts by weight of water and 1 part by weight of 70% aqueous $HBF_4$ are heated for 4 hours at 90° C. and then the water present is almost completely removed at the same temperature and up to a vacuum of 12 mm. Hg. 750 parts by weight of the mixture have been added to 7.5 parts by weight of powdered potassium hydroxide. 240 parts by weight of butene-1-oxide are pumped in an autoclave whereafter temperature is raised to 145° C. Within 2–3 hours further 1200 parts by weight of butene-1-oxide are added. The temperature is held at this temperature for another 2 hours. Volatile fractions are removed at 130° C./12 mm. Hg; a yield consisting of 1980 parts by weight of a viscous polyether is obtained (14.1% OH; acid number 1.2; viscosity 2160 cp./25° C.).

100 parts by weight of the polyether thus obtained are thoroughly mixed with 1 part by weight of N-methyl-N'-dimethyl-aminoethyl piperazine, 0.1 part of weight of dibutyl tin dilaurate, 0.5 part by weight of a polysiloxane-polyalkylene glycol copolymer and 6 parts by weight of a 50% aqueous solution of sodium castor oil sulphate. The mixture is foamed by addition of 170 parts by weight of 4,4'-diphenyl methane diisocyanate. A fine-pored hard foam plastic is obtained with the following physical properties:

| | |
|---|---|
| Weight per unit volume | kg./cm.³ 38 |
| Compressive strength | kg./cm.² 3.1 |
| Impact toughness | kg./cm. 0.4 |
| Thermal bending strength | °C 145 |
| Water absorption | percent 2.8 |

The foregoing examples are for the purpose of illustration and it is to be understood that any of the above listed compounds can be used throughout the examples in place of the particular compounds used in accordance with the particular disclosure.

Although the invention has been described in considerable detail for the purpose of illustration, it is to be understood that variations may be made therein by those skilled in the art without departing from the spirit of the invention and the scope of the claims.

What is claimed is:

1. A process for preparing polyurethane plastics which comprises reacting an organic polyisocyanate with a polyhydroxyl compound obtained from the reaction of a carbohydrate having at least four carbon atoms with a member selected from the group consisting of alcohols and phenols and at least 0.5 mol per monosaccharide unit of an oxo compound selected from the group consisting of aldehydes and ketones in the presence of water and an acid catalyst, removing water from the product of said first step to a residual water content of less than one percent and thereafter reacting the product with an alkylene oxide.

2. A process for preparing polyurethane plastics which comprises reacting an organic polyisocyanate with a polyhydroxyl compound obtained from the reaction of a carbohydrate having at least four carbon atoms with a member selected from the group consisting of alcohols and phenols and at least 0.5 mol per monosaccharide unit of an oxo compound selected from the group consisting of aldehydes and ketones in the presence of water and an acid catalyst, removing water from the product of said first step to a residual water content of less than one percent and thereafter reacting the product with an alkylene oxide at a temperature of from about 100° C. to about 200° C. in the presence of an alkali catalyst.

References Cited by the Examiner

UNITED STATES PATENTS

| | | | |
|---|---|---|---|
| 2,927,918 | 3/1960 | Anderson | 260—209 |
| 2,945,025 | 7/1960 | De Groote et al. | 260—209 |
| 2,955,091 | 10/1960 | Kane | 260—2.5 |
| 2,956,031 | 10/1960 | Khawam | 260—2.5 |
| 3,073,788 | 1/1963 | Hostettler et al. | 260—2.5 |

OTHER REFERENCES

Pigman: "The Carbohydrates-Chemistry Biochemistry Physiology," pages 188 to 205, Copyright 1957, published by Academic Press Inc., New York.

LEON J. BERCOVITZ, *Primary Examiner.*

D. ARNOLD, *Examiner.*

D. E. CZAJA, *Assistant Examiner.*